United States Patent Office 2,700,693
Patented Jan. 25, 1955

2,700,693
SILVER PEROXIDE ELECTRODE FOR ELECTRIC BATTERIES

Adolph Fischbach, Elberon, N. J., assignor to the United States of America as represented by the Secretary of the Army No Drawing. Application December 7, 1951,
Serial No. 260,556

3 Claims. (Cl. 136—6)

(Granted under Title 35, U. S. Code (1952), sec. 266)

The invention described herein may be manufactured and used by or for the Government for governmental purposes without the payment of any royalty thereon.

This invention relates to new electrodes of silver peroxide used as depolarizer electrode in various types of primary and secondary silver cells and batteries made from such cells. Such silver peroxide electrodes are usually employed together with zinc as the negative active material and a solution of potassium hydroxide as the preferred electrolyte.

Batteries in which silver peroxide is used as the depolarizer are now of great technical importance in electronic equipment, guided missiles, as meteorological batteries, hearing aids, etc.

The particular value of silver batteries lie in their large watt output per unit of weight and volume, and the nearly constant voltage at very high discharge rates which makes such batteries best adapted to continuous discharge within a relatively short period of time.

Silver peroxide electrodes may be prepared in several well known ways. The most customary method consists in pasting silver chloride or silver oxide into grids of copper screen which were previously plated with silver or nickel. The silver oxide paste is made from a mixture of powdered silver peroxide with a dilute solution of potassium hydroxide. After drying, the plates are discharged electrolytically to sponge silver and then formed (oxidized) in a 5% solution of potassium hydroxide at a current density of about 0.01 amperes per square centimeter or less. This oxidizing process is carried to the point of oxygen evolution which occurs at about 2.25 volts against a zinc electrode whereby the silver is converted into silver peroxide.

A number of difficulties are involved in the customary methods of making silver peroxide electrodes. In general, the object is to make thin plates as the batteries are usually intended for discharge at high rates. Therefore, a thin copper wire screen is used as a grid into which the silver peroxide is pasted in the form of a wet paste. However, the subsequent drying and forming of these electrodes leads to crumbling of the active material which falls out of the grid, thus imparing the function of the cell or making it even useless.

It is an object of this invention to overcome the above mentioned and other difficulties in the production of silver peroxide electrodes by a method which, broadly speaking, consists in impregnating a sintered nickel plaque of more than 60% porosity with a concentrated silver salt solution and cathodically polarizing the silver nitrate to metallic silver which is then oxidized to silver peroxide in a dilute potassium hydroxide solution.

Other objects of the invention will become apparent from the following detailed description of specific embodiments of the broad inventive idea.

Recent development in the art of powder metallurgy led to the manufacture of porous metal bodies having porosities varying in the range of from 60 to 90%. For instance, nickel plaques of a porosity up to 90% have been produced by using powders of low apparent density such as the so-called "carbonyl nickel powder" and by eliminating in the production process the step of compacting the plaques under pressure. The bonding of the loose carbonyl nickel powder to form a coherent mass occurs on heating at temperatures as low as 500° C. or on heating for a very brief period at 800° C. (See S. E. Buckley et al., "Carbonyl nickel and carbonyl iron powders, their production and properties," BIOS Final Report No. 1575—1947.) Such plaques may be made, for instance, from carbonyl nickel powder prepared by the thermal decomposition of dilute nickel carbonyl vapor. This powder, which can be made with an apparent density as low as 0.6 gram per cc., sinters with ease in a protective atmosphere and without the need for compacting under pressure. To increase the mechanical strength of plaques made from high porosity nickel powder a grid may be incorporated within the plaques.

The porous sintered nickel plaque made according to any known procedure which leads to a porosity of more than 60% is now impregnated with a super-saturated solution of silver nitrate by dipping the sintered nickel plaque into a hot solution which has been saturated with silver nitrate at a temperature of about 100° C. The impregnation may also occur at normal temperature under vacuum. The impregnating plaque is then cathodically polarized in sodium hydroxide or potassium hydroxide to silver hydroxide and then again impregnated with a saturated silver nitrate solution and further treated as described above. The cycle is repeated three or four times until the desired amount of silver has been precipitated in the porous nickel plaque. Silver chloride may be used instead of silver nitrate. The pores of the sintered nickel plaque must not be completely choked up with silver. Sufficient porosity should be left for quick penetration of the electrolyte into the plaque so that high rate discharge of the cell is made possible. After the sintered plaque has received the proper amount of silver it is washed to remove all traces of silver nitrate, dried and then anodically formed in a potassium hydroxide solution of about 5% to give the desired silver peroxide $(Ag_2O_2)$.

Instead of oxidizing individually the silver loaded nickel plaques it is, of course, possible to assemble the latter into batteries and charge these batteries to anodically form the desired silver peroxide. Only if dry charged batteries are required is it necessary to oxidize the individual plaques before assembling.

The silver electrode according to the invention is preferably used in primary or secondary batteries with zinc negative electrodes consisting either of massive, plated, or sponge zinc. The silver electrode made according to this invention results in batteries having improved discharge characteristics and longer shelf-life in the activated condition since the positive active silver material is contained in the porous structure of the sintered nickel plaque. The new silver electrode gives also mechanically stronger plates than those made according to previous methods.

For those skilled in the art it will be apparent that many different embodiments of the invention are possible using various other silver salts (such as silver chloride) for the impregnation of the sintered porous nickel plaque and various methods known in itself for polarizing and oxidizing the silver within the plaques.

What is claimed is:

1. Process of making thin, flat electrodes of silver peroxide comprising impregnating a sintered porous nickel plaque of more than 60 per cent porosity obtained by thermal decomposition of nickel carbonyl, with a concentrated silver salt solution, cathodically polarizing the silver in an alkaline electrolyte and anodically forming the silver in an alkaline electrolyte to silver peroxide.

2. Process of making electrodes of silver peroxide according to claim 1 in which said silver salt consists of silver nitrate.

3. Process of making electrodes of silver peroxide according to claim 1 in which said silver salt consists of silver chloride.

References Cited in the file of this patent

UNITED STATES PATENTS

| Number | Name | Date |
|---|---|---|
| 882,144 | Edison | Mar. 17, 1908 |
| 1,988,861 | Thorausch et al. | Jan. 22, 1935 |
| 2,007,170 | Basca | July 9, 1935 |
| 2,198,042 | Schlect et al. | Apr. 23, 1940 |
| 2,594,714 | Andre | Apr. 29, 1952 |
| 2,601,133 | Yardeny | June 17, 1952 |

FOREIGN PATENTS

| Number | Country | Date |
|---|---|---|
| 361,164 | Great Britain | Nov. 19, 1931 |